(12) United States Patent
Richert

(10) Patent No.: US 12,337,358 B1
(45) Date of Patent: Jun. 24, 2025

(54) POOL FILTER CLEANING MACHINE

(71) Applicant: David Richert, Lake Worth Beach, FL (US)

(72) Inventor: David Richert, Lake Worth Beach, FL (US)

( * ) Notice: Subject to any disclaimer, the term of this patent is extended or adjusted under 35 U.S.C. 154(b) by 274 days.

(21) Appl. No.: 17/992,677

(22) Filed: Nov. 22, 2022

(51) Int. Cl.
  *B08B 3/02* (2006.01)
  *B01D 41/04* (2006.01)
  *B05B 1/20* (2006.01)
  *B08B 13/00* (2006.01)

(52) U.S. Cl.
  CPC .............. *B08B 3/022* (2013.01); *B01D 41/04* (2013.01); *B05B 1/20* (2013.01); *B08B 13/00* (2013.01); *B08B 2203/007* (2013.01); *B08B 2203/0211* (2013.01); *B08B 2203/0247* (2013.01); *B08B 2203/027* (2013.01)

(58) Field of Classification Search
  CPC .... B01D 41/04; B01D 29/6438; B08B 3/022; E04H 4/16; B44D 3/006
  See application file for complete search history.

(56) References Cited

U.S. PATENT DOCUMENTS

| | | | |
|---|---|---|---|
| 8,857,452 B2 | 10/2014 | Martin | |
| 9,675,910 B1 * | 6/2017 | Wade | B01D 41/04 |
| 10,751,655 B2 | 8/2020 | Hicks | |
| 2002/0166578 A1 * | 11/2002 | Leblond | B01D 41/04 |
| | | | 134/140 |
| 2017/0284115 A1 * | 10/2017 | Rejniak | B01D 29/114 |
| 2024/0042357 A1 * | 2/2024 | LaDue | B01D 41/04 |

* cited by examiner

*Primary Examiner* — Spencer E. Bell
(74) *Attorney, Agent, or Firm* — Sanchelima & Associates, P.A.; Jesus Sanchelima; Christian Sanchelima

(57) ABSTRACT

A pool filter cleaning machine including a housing assembly, a cleaning assembly, and an electric assembly. Housing assembly includes a hose intake where a garden hose is coupled to supply water that flows through a hose pipe inside the base, a container attached to and edge of the base includes a receiving portion where a plurality of sprays are placed around the cylindrical shape of the container, where a pool filter is placed and is washed and sanitized by means of the water that flows through the hose pipe and is thrown through the plurality of sprays. During the cleaning process, the pool filter rotates by means of a rotating base proximal to the bottom of the container driven by a drive and driven pulley mechanism actuated by an integral circuit device placed inside of the base that automate the operation of the elements herein described.

1 Claim, 4 Drawing Sheets

POOL FILTER CLEANING MACHINE

1. FIELD OF THE INVENTION

The present invention relates to a filter cleaner and, more particularly, to a pool filter cleaning machine that includes a container where the pool filter is placed, allowing the pool filter to be cleaned, washed, and dried by means of a cleaning system.

2. DESCRIPTION OF THE RELATED ART

Several designs for filter cleaners have been designed in the past. None of them, however, include an automated cleaning system that includes a container suitable in size for a pool filter, where inside the container a plurality of sprays are used to throw a cleaning solution and water in order to wash, sanitize, clean and dry the pool filter while rotating by means of a rotating base driven by a pulley.

Applicant believes that a related reference corresponds to U.S. Pat. No. 10,751,655 issued for swimming pool filter cartridge washer. Applicant believes that another related reference corresponds to U.S. Pat. No. 8,857,452 issued for radial flow filter with traveling spray device. None of these references, however, teach of a drum container that is adapted to connect to a water hose and dispense water inwardly for spraying the filter to cleaning it Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a device that uses minimal water to clean pool filters.

It is another object of this invention to provide a device that speeds up cleaning time and extending the life of a pool filter.

It is still another object of the present invention to provide a device that reduces spreading diseases in pools.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an operational view of an exemplary embodiment of the present invention 10, wherein the user may open the cover 30 in order to place the pool filter 100 inside the container 24.

FIG. 2 shows an exploded view of the base 22 attached to the container 24, the pool filter 100 and the cover 30.

V. DETAILED DESCRIPTION OF THE EMBODIMENTS OF THE INVENTION

Figure 1:
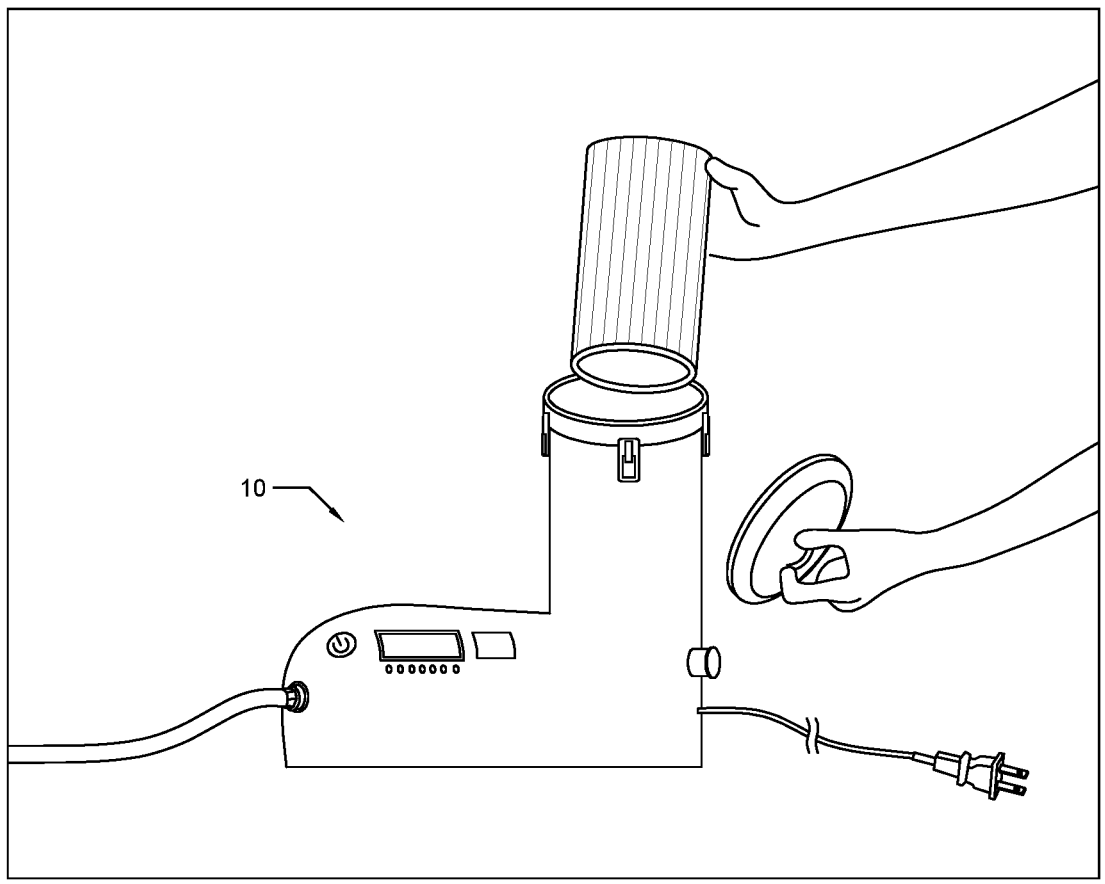

Referring now to the drawings, where the present invention is generally referred to with numeral 10, it can be observed that it basically includes a housing assembly 20, a cleaning assembly 40, an electric assembly 60 and various exemplary embodiments (100) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
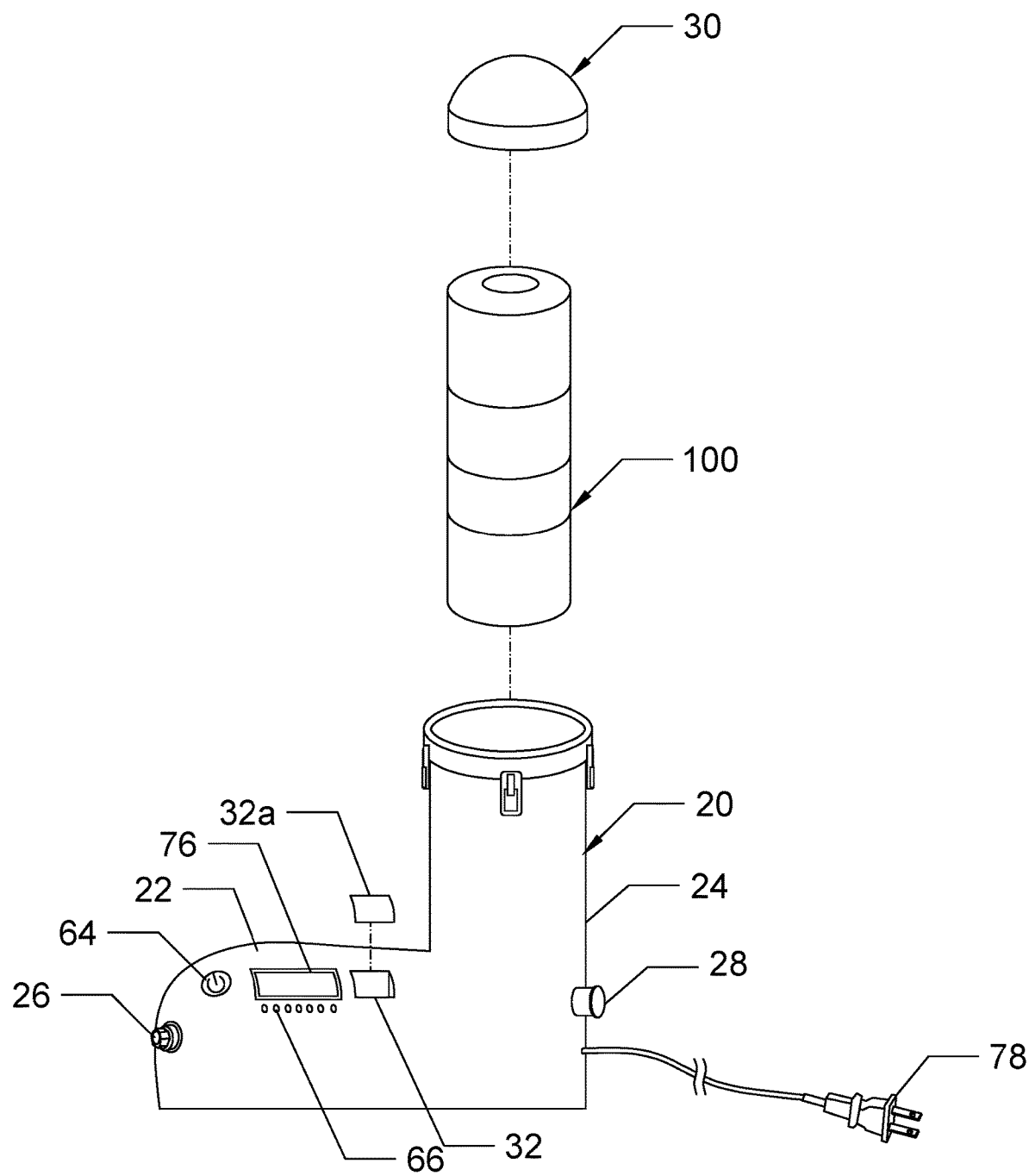

Housing assembly 20 includes a base 22, a container 24, a hose intake 26, a drain hose 28, a lid 30, a solution compartment 32 and a compartment cover 32. In an exemplary embodiment, the base 22 may have a cylindrical shape oriented in a horizontal position, wherein the cylindrical shape may have a flat surface configured to be placed parallel to a surface and a spherical edge. In a suitable embodiment, container 24 may have a cylindrical shape oriented in a vertical position, wherein the container 24 is attached to an edge of the base 22 opposite to the spherical shape, thereby confirming a L-shape. As illustrated in FIG. 1. In a preferred embodiment, the base 22 and the container 24 may have a hollow body, wherein the hollow body may have a shape of the L-shape that conforms to the base 22 and the container 24. Nonetheless, it should be considered that the base 22 and the container 24 may have a regular shape, an irregular shape, or any other suitable shape. In one embodiment, the base 22 and the container 24 may be made of alloy steel, allow aluminum, acrylic, polycarbonate, carbon fiber, polypropylene, or any other suitable variation thereof. The container 24 may have a suitable height to receive a pool filter 100 inside thereof. As FIG. 2 represents. In other embodiment, a hose intake may be attached to a portion of the spherical shape of the base 22, wherein the hose intake 26 may be a garden hose connector, a brass garden hose connector, a plastic hose connector or any other suitable connector known in prior art to connect a water hose. In a suitable embodiment, the drain hose 28 may be attached to a portion of the container 24, wherein the drain hose 28 may be a hose connector with a lid well known in the art to drain the water contained into the container 24. In other embodiment, the lid 30 may be placed in a top portion of the container 24, wherein the lid 30 may be removably attachable to the container, thereby the lid 30 may be snapped shut by means of a latch mechanism and being removed from the container 24 by releasing the latch mechanism. Nonetheless, it should be considered that the lid 30 may be attached and released from the container 24 by any other suitable mechanism known in the art. The lid 30 may have a half-spherical shape, a circular shape, a regular shape, an irregular shape, or any other suitable shape with a periphery that conforms with a top periphery of the container 24 allowing a seal therebetween. In a preferred embodiment, the lid 30 may be made of alloy steel, allow aluminum, acrylic, polycarbonate, carbon fiber, polypropylene, or any other suitable variation thereof. In one embodiment, the solution compartment 32 may be placed in a portion of the base 22, wherein the solution compartment 32 may be a suitable compartment to receive a cleaning solution therein. In other embodiment, the compartment cover 32a may protect the interior of the solution compartment, wherein the compartment cover 32a may be removably attachable from the solution compartment 32 by means of a pull tab mechanism or any other suitable mechanism known in prior art. Nonetheless, in a suitable variation, the compartment cover 32a may be hingedly attached to the compartment cover.

Figure 3:
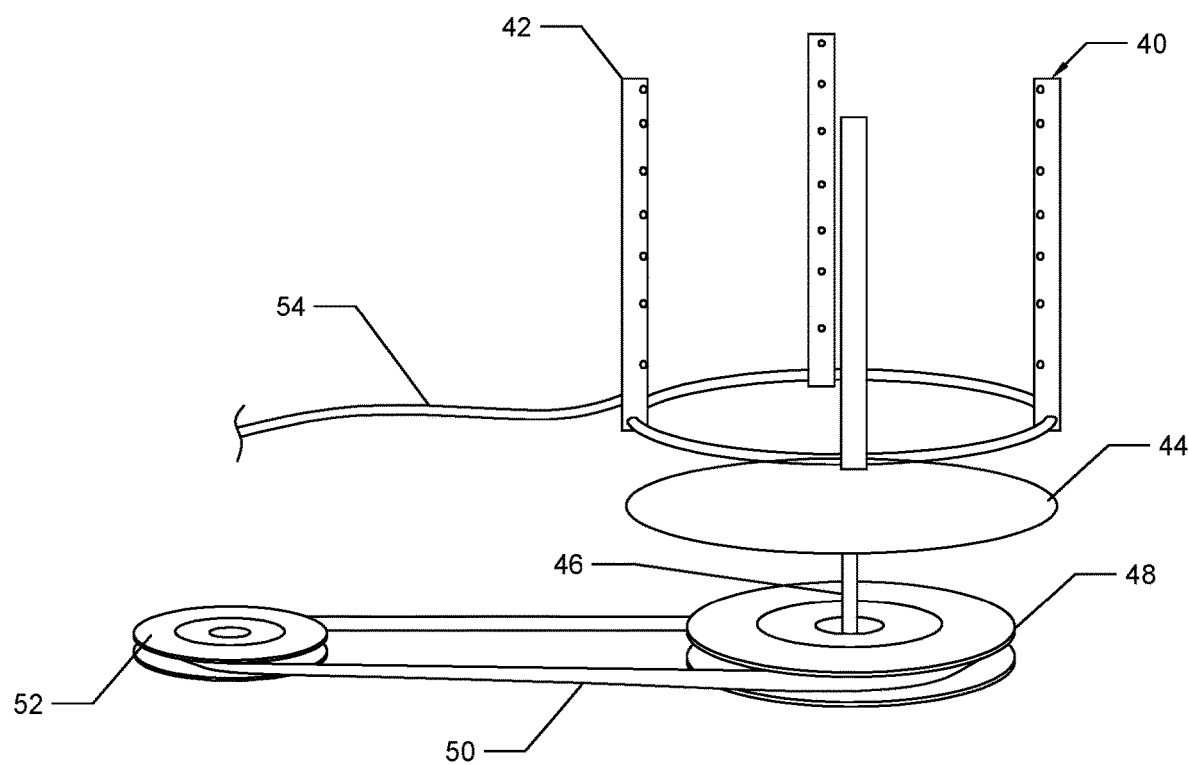
FIG. 3 illustrates an isometric view of the cleaning assembly 40.

Cleaning assembly 40 includes a plurality of sprays 42, a rotatory base 44, a first shaft 46, a first pulley 48, a belt 50 a second pulley 52, and a hose pipe 54. In an exemplary embodiment, the plurality of sprays 42 may have a hollow cuboid shape attached on an internal side of the container 24, wherein the plurality of sprays 42 may have a large body, thereby a top edge of the plurality of sprays 42 may be placed proximal to the top periphery of the container 24 and the bottom edge of the plurality of sprays 42 may be placed proximal to a bottom portion of the container 24. The plurality of sprays 42 includes a plurality of holes oriented toward the center portion of the container 24. In a suitable embodiment the plurality of sprays 42 may be connected therebetween by means of a hose pipe 54, thereby the water may flow through the hose pipe and be thrown through the plurality of holes. Best depicted in FIG. 3. In a preferred embodiment, the rotatory base 44 may have a circular shape, wherein said rotatory base 44 may be placed inside the container 24 and below the plurality of sprays 42, nonetheless, it should be considered that the rotatory base 44 may be placed parallel to the bottom edge of the plurality of sprays 42. The rotatory base 44 may have a flat top portion, nevertheless, in a suitable variation, the rotatory base 44 may include an anti-slip material and/or a predetermined design that allows the pool filter 100 to be held in place. The rotatory base 44 may have a suitable circumference to be placed inside the container 24 preventing it from being in contact with the cylindrical shape of the container while rotating. In other embodiment, a first shaft 46 is attached to centered bottom side of the rotatory base 44, wherein said first shaft 46 is coupled to a first pulley 48, the first pulley 48 is coupled to a second pulley 52 by means of a belt 50, thereby the first pulley 48 is driven by the second pulley 52. As shown in FIG. 3. It should be considered that first pulley 48 may have a bigger circumference than the second pulley 52, thereby the rotatory motion of the first pulley 48 will decrease with respect to the first pulley 48. In other embodiment, the hose pipe 54 may be a watering hose pipe, a PVC hose pipe, and flexible silicone hose pipe, or any other suitable variation thereof wherein water may flow through therein.

Figure 4:
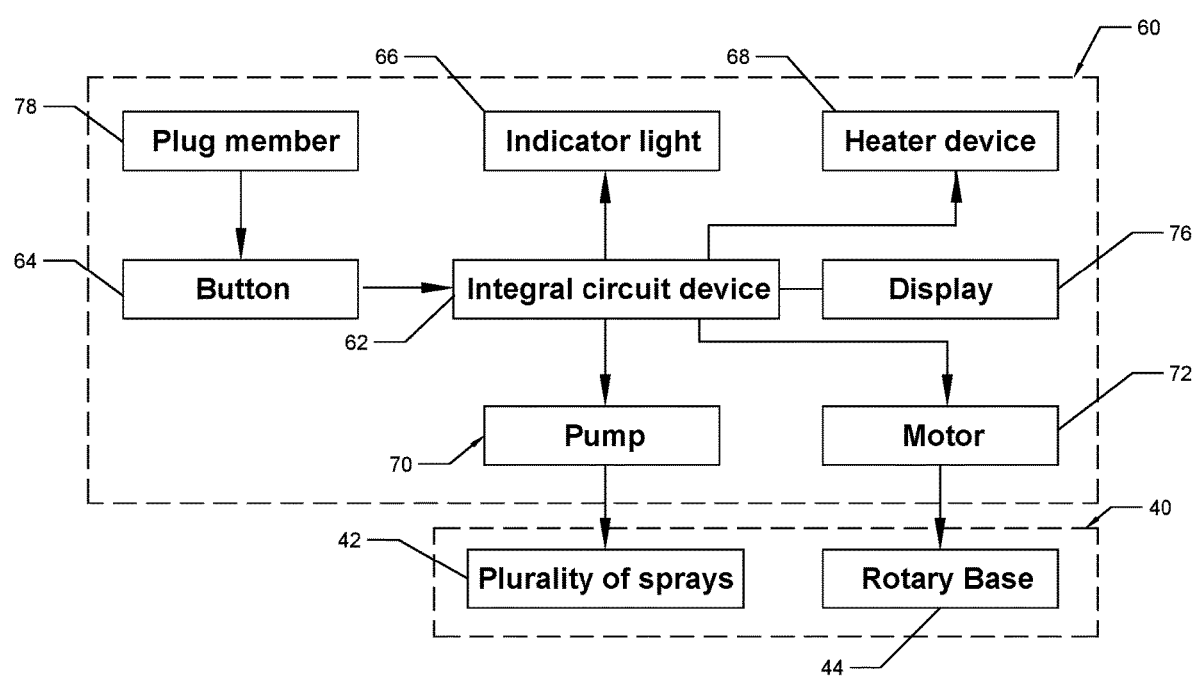
FIG. 4 is a representation of a diagram of the components of the present invention 10.

Electric assembly 60 includes an integral circuit device 62, a button 64, an indicator light 66, a heater device 68, a pump 70, a motor 72, a second shaft 74, a display 76 and a plug member 78. In an exemplary embodiment, integral circuit device 62 may be housed inside the base 22, wherein the integral circuit device 62 may include the proper circuitry to supply the proper voltage and current to the electronic elements herein described. In a suitable embodiment, the button 64, the indicator light 66, the heater device 68, the pump 70, the motor 72, and the plug member 78 are operatively connected to the integral circuit device. In a preferred embodiment, the button 64 may be placed in a portion of the base 22, wherein the button 64 may be a push lock switch, a rotary switch, a toggle switch, or any other variation well known in prior art. The button 64 may be operatively connected to the integral circuit device 62 and to the plug member 78, thereby the button 64 may cause a change in the state the electrical circuit while is physically actuated allowing the integral circuit device 62 to be powered by means or the plug member 78 while connected to the power supply. In a suitable embodiment, indicator light 66 may be placed in a portion of the base 22, wherein the indicator light 66 may include a plurality of lights allowing the present invention 10 to illustrate the status of a cleaning process thereof. In other embodiment, the display 76 may be placed in a portion of the base 22, wherein the display 76 may be a timer that illustrates the remaining time of each of the cleaning process. In a preferred embodiment, heater device 68 may receive water from the hose pipe 54 connected to the hose intake 26, thereby the water may be heated when the heater device is actuated and flowing through the hose pipe 54 to a pump 70, allowing the water to increase the outlet pressure through the plurality of sprays 42. In other embodiment, the motor is actuated by the integral circuit device 62 according to the cleaning process, wherein the motor includes a second shaft 74 attached to the second pulley 52, therefore rotatory motion of the rotatory base 44 may be driven by the actuation of the motor 72. As best depicted in FIG. 4.

The present invention 10 also provides a cleaning process of the pool filter 100. The cleaning process comprises of a presoak, wherein the foam spray may spray ahead on inside the container 24, allowing the pool filter to be cleaned by breaking down dirt, grime, and bacteria. A wash cycle, wherein hot water mixed with the cleaning solution may fill the container 24 until cover the pool filter 100, thereby eliminating bacteria, microorganisms and the like while rotating by means of the rotatory motion of the rotatory base 44. Drying cycle may drain the water through the drain hose 28, therefore the rotatory motion of the rotatory base 44 will increase allowing the pool filter 100 being dried by means of a centrifugal force. It should be considered that each of the cleaning process may start and stop automatically, wherein each cleaning process may have a predetermined period, said cleaning process is illustrated on the indicator light and said predetermined time period is shown on the display.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A pool filter cleaning machine, consisting of:
   a housing assembly including a base, a container, a hose intake, a drain hose and a cover, wherein said base has a cylindrical shape with a hollow body, said cylindrical shape has a flat bottom surface and a spherical shape at an edge thereof, said container has a cylindrical shape with a hollow body and an opening in a top portion thereof, said container is attached to said base at the opposite edge with respect to said spherical shape, said base and said container creates a L-shape, said hose intake is placed in a lateral side of said base, wherein said hose intake has a threaded portion wherein a garden hose is attached to provide water, said drain hose is placed in a lateral portion proximal to a bottom edge of said container, said cover is removably attachable to said top portion of said container;
   a cleaning assembly having a plurality of sprays, a rotatory base, a first shaft, a first pulley, a belt, a second pulley, and hose pipe, wherein said plurality of sprays are attached along the internal side of said container, said hose pipe is connected to said plurality of sprays and to a pump, wherein inside of said hose pipe flows water and squirts out the water to the interior of the container by means of a plurality of holes included in said plurality of sprays, the rotatory base has a circular shape and is placed in a bottom portion inside of said container, said rotatory base is driven by means of said first pulley, wherein said rotatory base is attached to said first pulley by means of the first shaft, wherein said first pulley is driven by said second pulley, said first pulley and said second pulley are connected therebetween by means of the belt, said second pulley transmits a rotatory motion from a motor to said first pulley; and an electric assembly including an integral circuit device, a button, a heater device, an indicator light, a display, a second shaft, a pump, said motor and a plug member, wherein said integral circuit device includes a circuitry to automate a cleaning process of said pool filter cleaning machine, said motor, said pump, said integral circuit device are housed inside of said base, said button is placed in an external side of said base and is operatively connected to said integral circuit device, said heater device is placed inside said base and is connected to said hose pipe to heat said water that flows through said hose pipe, said pump is placed inside said base and is connected to said hose pipe to increase the flow pressure of said water, said motor is placed inside of said base and is operatively connected to said integral circuit device, said motor drives the second pulley coupled to said first pulley by means of said belt, said water provided by means of a garden hose connected to said hose intake flows through the hose pipe, being heated by said heater device and being pressurized by said pump, thereby said water squirts out to the interior of said container by means of said plurality of holes.

* * * * *